(12) United States Patent
Jang (10) Patent No.: US 9,211,925 B2
(45) Date of Patent: Dec. 15, 2015

(54) LOADING JIG APPARATUS COMMONLY USED FOR TRUNK LID AND TAIL GATE

(71) Applicant: Hyundai Motor Company, Seoul (KR)

(72) Inventor: Yoon Jang, Incheon-si (KR)

(73) Assignee: Hyundai Motor Company, Seoul (KR)

( * ) Notice: Subject to any disclaimer, the term of this patent is extended or adjusted under 35 U.S.C. 154(b) by 60 days.

(21) Appl. No.: 14/089,383

(22) Filed: Nov. 25, 2013

(65) Prior Publication Data

US 2014/0366352 A1   Dec. 18, 2014

(30) Foreign Application Priority Data

Jun. 14, 2013   (KR) .................. 10-2013-0068319

(51) Int. Cl.
*B62D 65/02* (2006.01)
*B62D 65/06* (2006.01)

(52) U.S. Cl.
CPC .............. *B62D 65/026* (2013.01); *B62D 65/06* (2013.01); *Y10T 29/53961* (2015.01)

(58) Field of Classification Search
CPC ...... B25H 1/0007; B23Q 1/5347; B23Q 3/18; B62D 65/00; B62D 65/02; B62D 65/022; B62D 65/024; B62D 65/026; B62D 65/06; B62D 65/14; B62D 65/16; B62D 65/18
See application file for complete search history.

(56) References Cited

U.S. PATENT DOCUMENTS

| 4,024,959 | A | * | 5/1977 | Gruner | 414/751.1 |
| 4,691,905 | A | * | 9/1987 | Tamura et al. | 269/45 |
| 4,781,517 | A | * | 11/1988 | Pearce et al. | 414/590 |
| 4,804,162 | A | * | 2/1989 | Rice | 248/671 |
| 5,659,939 | A | * | 8/1997 | Whitehouse | 29/281.4 |
| 2012/0146274 | A1 | * | 6/2012 | Kim | 269/61 |

FOREIGN PATENT DOCUMENTS

| KR | 10-2009-0111623 A | 10/2009 |
| KR | 10-2012-0063777 A | 6/2012 |
| KR | 10-2012-0089875 A | 8/2012 |

* cited by examiner

*Primary Examiner* — Lee D Wilson
*Assistant Examiner* — Tyrone V Hall, Jr.
(74) *Attorney, Agent, or Firm* — Morgan, Lewis & Bockius LLP (57) ABSTRACT

A loading jig apparatus may include a jig frame, first moving units installed on the jig frame and moved in up and down directions, left and right directions, and front and rear directions by driving a drive motor, first support units installed at the first moving units respectively, and supporting both sides of the vehicle body panel, second support units installed on the jig frame to correspond to a front side of the vehicle body panel, and supporting the front side of the vehicle body panel, at least one second moving unit installed on the jig frame to correspond to a rear side of the vehicle body panel and moved in the up and down directions and the front and rear directions by driving a drive motor, and a third support unit installed on the second moving unit, and supporting the rear side of the vehicle body panel.

19 Claims, 8 Drawing Sheets

LOADING JIG APPARATUS COMMONLY USED FOR TRUNK LID AND TAIL GATE

CROSS-REFERENCE TO RELATED APPLICATION

The present application claims priority to Korean Patent Application No. 10-2013-0068319 filed on Jun. 14, 2013, the entire contents of which is incorporated herein for all purposes by this reference.

BACKGROUND OF THE INVENTION

1. Field of the Invention

An exemplary embodiment of the present invention relates to an assembly system of a trunk lid and a tail gate, and more particularly, to a loading jig apparatus commonly used for a trunk lid and a tail gate capable of positioning and aligning the trunk lid and the tail gate at a home position in a production line.

2. Description of Related Art

In general, a vehicle body may be assembled through processes of mounting various panel components such as a floor panel, a side panel, a roof panel, a trunk lid panel, a tail gate panel, a hood panel, and a fender panel.

Each of the panels is manufactured by a press processing or the like in a sub-process, and may be mounted to the vehicle body by assembly work such as assembling, welding, sealing, and hemming in a state of being restricted (positioned at a home position, aligned, clamped, and the like) on a panel jig apparatus during a vehicle body assembly process.

Here, the panel jig apparatus serves to fix, position and align the panel at the home position, and for example, may be classified into a key, a loading jig, an additional placement jig, a marriage jig, a hinge assembly jig, and the like in an assembly line in which the trunk lid and the tail gate of the vehicle are produced in accordance with functions thereof. The jigs are the main equipment that determines assembly qualities of the trunk lid and the tail gate, a loading jig among the jigs may be applied to position and align the trunk lid and the tail gate at the home position.

Meanwhile, in the related art, in order to assemble the trunk lid and the tail gate, the respective loading jigs are required to position and align inner parts, outer parts, and assemblies of the trunk lid and the tail gate at the home position.

Further, the respective loading jigs are difficult to be applied in common to the trunk lid and the tail gate, which have different shapes and sizes in accordance with types of vehicles, and thus a restriction unit for exclusive use, which exclusively positions and aligns the trunk lid and the tail gate, respectively, at the home position in accordance with types of vehicles and items, is used.

Therefore, in the related art, because the respective loading jigs are required to position and align the trunk lid and the tail gate at the home position, and restriction units for exclusive use, which are different from each other in accordance with types of vehicles and items, are applied to the respective loading jigs, it is disadvantageous in flexible manufacturing for various types of vehicles, and additional investment costs due to modifications or new manufacture of the jig may be increased when applying the jig to new types of vehicles.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a loading jig apparatus commonly used for a trunk lid and a tail gate capable of loading trunk lids and tail gates of different types of vehicles in common in an assembly line in which the trunk lid and the tail gate are produced.

An exemplary embodiment of the present invention provides a loading jig apparatus commonly used for a trunk lid and a tail gate, which serves to position and align vehicle body panels including inner parts, outer parts, and assemblies of the inner parts and the outer parts of the trunk lid and the tail gate at a home position in common, the loading jig apparatus including a jig frame, a pair of first moving units which is installed on the jig frame so as to correspond to both left and right sides of the vehicle body panel, and moved in up and down directions, left and right directions, and front and rear directions by driving a drive motor, first support units which are installed at the first moving units, respectively, and support both sides of the vehicle body panel, a pair of second support units which is installed on the jig frame so as to correspond to a front side of the vehicle body panel, and supports the front side of the vehicle body panel, at least one second moving unit which is installed on the jig frame so as to correspond to a rear side of the vehicle body panel, and moved in the up and down directions and the front and rear directions by driving a drive motor, and a third support unit which is installed on the second moving unit, and supports the rear side of the vehicle body panel.

The first support units may include first guiders which are mounted to the first moving units by first mounting brackets, respectively, and align both side portions of the vehicle body panel.

The first support units may include first roller attachments which are rotatably installed on the first mounting brackets, and support both side portions of the vehicle body panel.

The second support units may include first guide attachments which are mounted to the jig frame by first fixing brackets, respectively, fixedly installed to the first fixing brackets by second mounting brackets, and support the front side of the vehicle body panel.

At the first guide attachment, a first guide surface, which aligns the front side of the vehicle body panel in a weight direction of the vehicle body panel, may be formed to be inclined.

At the first guide attachment, a second guide surface, which supports the front side of the vehicle body panel in a horizontal direction at a lower side of the first guide surface, may be formed to be flat.

The first guide surface may be formed as a round-shaped spherical surface along an inclined direction.

The second guide surface may be formed as a flat surface along the horizontal direction.

The second support units may include second guiders which are installed to the jig frame by first fixing brackets, respectively, mounted to the first fixing brackets by second mounting brackets, and align the front side of the vehicle body panel.

The second support units may include second roller attachments which are rotatably installed on the second mounting brackets, and support the front side of the vehicle body panel.

The third support unit may include a second fixing bracket which is installed on the second moving unit in both side directions of the vehicle body panel, and swivel pads which are mounted on both sides of the second fixing bracket, and swivelably provided by ball joints so as to correspond to a rear side cross-sectional angle of the vehicle body panel.

The third support unit may include second guide attachments which are fixedly mounted on the pair of second moving units by third mounting brackets, respectively, and support the rear side of the vehicle body panel.

At the second guide attachment, a third guide surface, which aligns the rear side of the vehicle body panel in a weight direction of the vehicle body panel, may be formed to be inclined.

At the second guide attachment, a fourth guide surface, which supports the rear side of the vehicle body panel in a horizontal direction at a lower side of the third guide surface, may be formed to be flat.

The third guide surface may be formed as a round-shaped spherical surface along an inclined direction.

The fourth guide surface may be formed as a flat surface along the horizontal direction.

The third support unit may include third guiders which are mounted to the pair of second moving units by third mounting brackets, respectively, and align the rear side of the vehicle body panel.

The third support unit may include third roller attachments which are rotatably installed on the third mounting brackets, and support the rear side of the vehicle body panel.

The loading jig apparatus may further include at least one third moving unit which is installed on the jig frame so as to correspond to a central side of a skin surface of the vehicle body panel, and moved in the up and down directions and the front and rear directions by driving a drive motor.

The loading jig apparatus may further include a fourth support unit which is installed on the third moving unit, and supports the skin surface of the vehicle body panel.

The fourth support unit may include a third fixing bracket which is installed on the third moving unit in both side directions of the vehicle body panel, and fourth roller attachments which are rotatably installed on both sides of the third fixing bracket, respectively, and come into contact with the skin surface of the vehicle body panel.

In addition, another exemplary embodiment of the present invention provides a loading jig apparatus commonly used for a trunk lid and a tail gate, which serves to position and align vehicle body panels including inner parts of the trunk lid and the tail gate at a home position in common, the loading jig apparatus including a jig frame which may include a base frame, and a vertical frame installed at a rear side edge of the base frame in a vertical direction, a pair of first moving units which is installed on the vertical frame so as to correspond to both left and right sides of the vehicle body panel, and moved in up and down directions, left and right directions, and front and rear directions by driving a drive motor, first guiders which are mounted at the first moving unit, respectively, and align both side portions of the vehicle body panel, first roller attachments which are rotatably installed at the first moving unit, respectively, and support both sides of the vehicle body panel, a pair of first guide attachments which is mounted to the base frame so as to correspond to a front side of the vehicle body panel, and supports the front side of the vehicle body panel, a second moving unit which is installed on the vertical frame so as to correspond to a rear side of the vehicle body panel, and moved in the up and down directions and the front and rear directions by driving a drive motor, and a pair of swivel pads which is mounted at the second moving unit, and swivelably provided by ball joints so as to correspond to a rear side cross-sectional angle of the vehicle body panel.

At the first guide attachment, a first guide surface, which aligns the front side of the vehicle body panel in a weight direction of the vehicle body panel, may be formed to be inclined.

At the first guide attachment, a second guide surface, which supports the front side of the vehicle body panel in a horizontal direction at a lower side of the first guide surface, may be formed to be flat.

The first guide surface may be formed as a round-shaped spherical surface along an inclined direction.

The second guide surface may be formed as a flat surface along the horizontal direction.

Moreover, yet another exemplary embodiment of the present invention provides a loading jig apparatus commonly used for a trunk lid and a tail gate, which serves to position and align vehicle body panels including outer parts of the trunk lid and the tail gate at a home position in common, the loading jig apparatus including a jig frame, a pair of first moving units which is installed on the jig frame so as to correspond to both left and right sides of the vehicle body panel, and moved in up and down directions, left and right directions, and front and rear directions by driving a drive motor, first guiders which are mounted at the first moving unit, respectively, and align both side portions of the vehicle body panel, first roller attachments which are rotatably installed at the first moving unit, respectively, and support both sides of the vehicle body panel, a pair of first guide attachments which is mounted to the jig frame so as to correspond to a front side of the vehicle body panel, and supports the front side of the vehicle body panel, a pair of second moving units which is installed on the jig frame so as to correspond to a rear side of the vehicle body panel, and moved in the up and down directions and the front and rear directions by driving a drive motor, and second guide attachments which are installed at the second moving units, respectively, and support the rear side of the vehicle body panel.

At the second guide attachment, a third guide surface, which aligns the rear side of the vehicle body panel in a weight direction of the vehicle body panel, may be formed to be inclined.

At the second guide attachment, a fourth guide surface, which supports the rear side of the vehicle body panel in a horizontal direction at a lower side of the third guide surface, may be formed to be flat.

The third guide surface may be formed as a round-shaped spherical surface along an inclined direction.

The fourth guide surface may be formed as a flat surface along the horizontal direction.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 1:
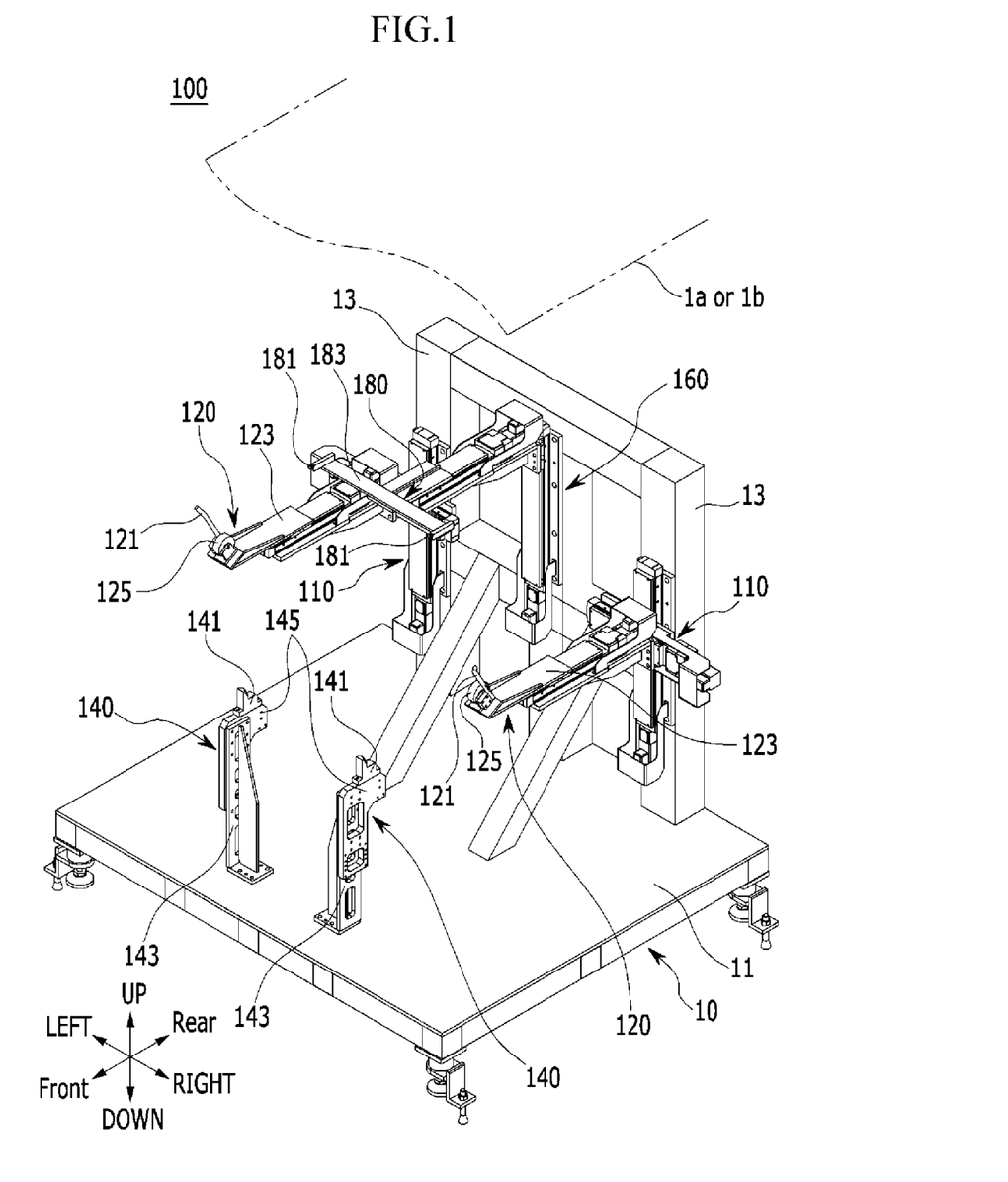
FIGS. 1 to 3 are perspective views illustrating a loading jig apparatus commonly used for a trunk lid and a tail gate according to an exemplary embodiment of the present invention.
Figure 2:
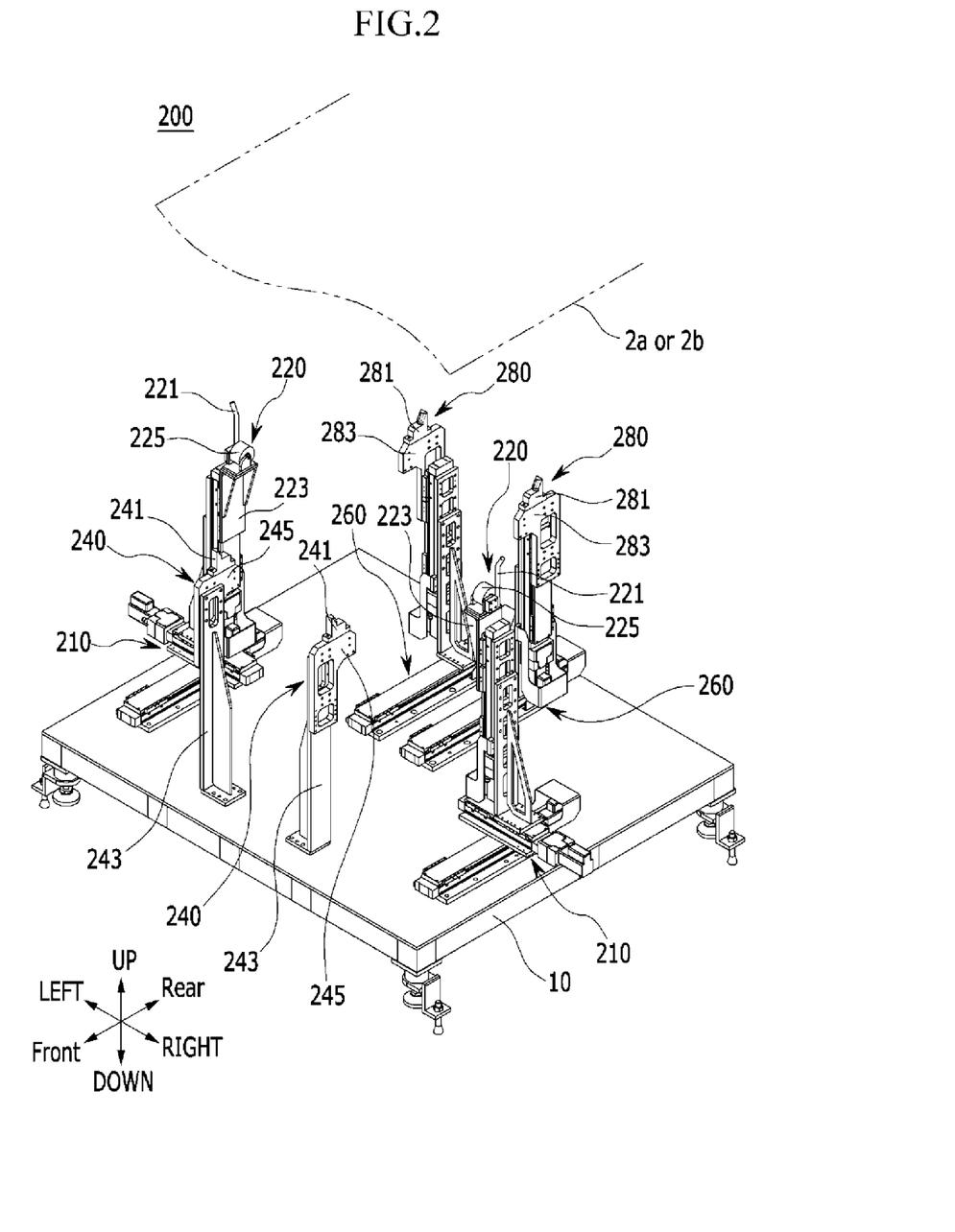
Figure 3:
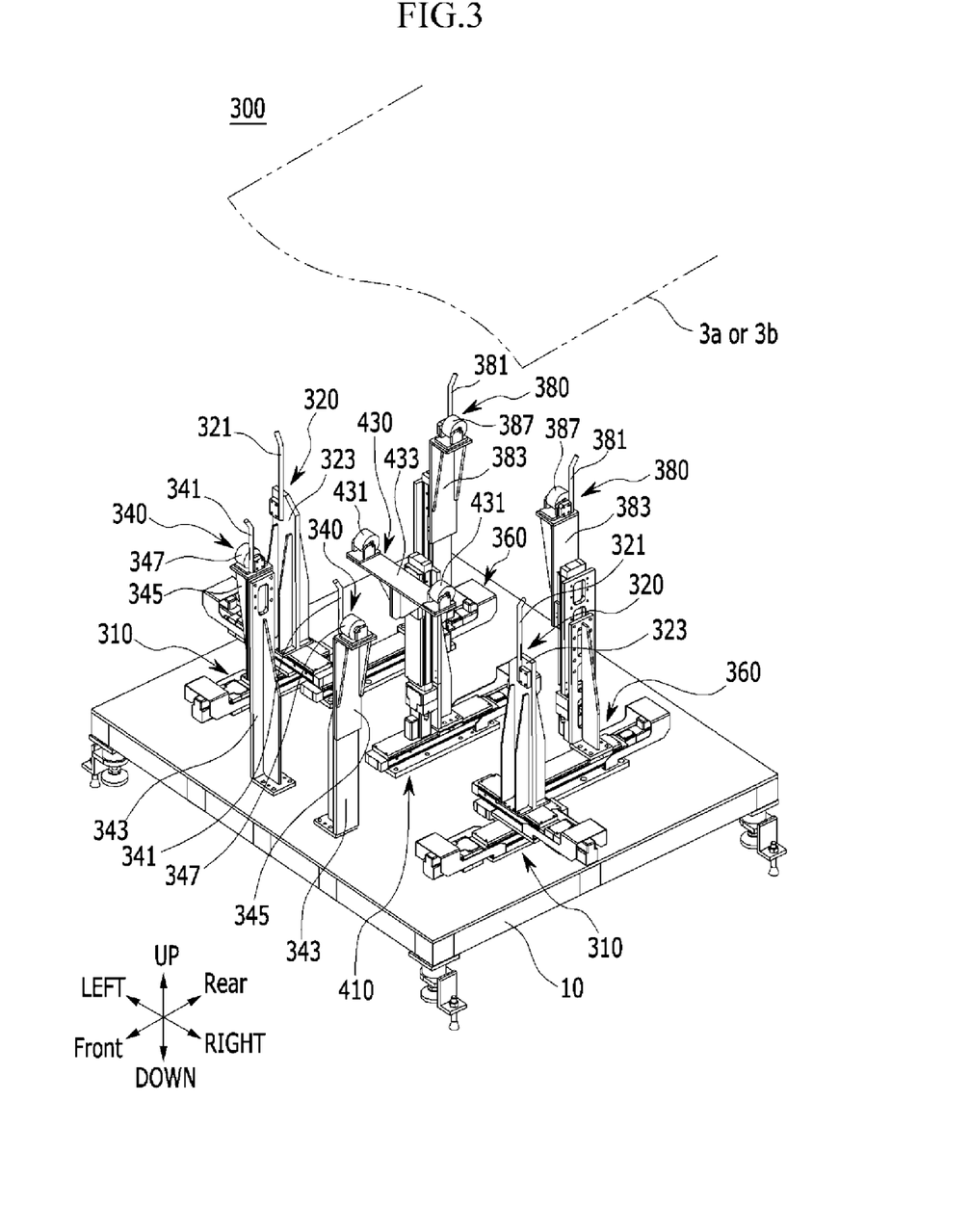

FIGS. 1 to 3 are perspective views illustrating a loading jig apparatus commonly used for a trunk lid and a tail gate according to an exemplary embodiment of the present invention.

Referring to FIGS. 1 to 3, loading jig apparatuses 100, 200, and 300 commonly used for a trunk lid and a tail gate according to an exemplary embodiment of the present invention may be applied to a vehicle body assembly system which assembles various panels, which are manufactured in a vehicle body sub-assembly line and conveyed, to the vehicle body.

For example, the loading jig apparatuses 100, 200, and 300 commonly used according to the exemplary embodiment of the present invention may be applied for fixing, positioning, and aligning the panels at home positions in an assembly line where a trunk lid and a tail gate of a vehicle are produced.

The loading jig apparatuses 100, 200, and 300 commonly used may position and align inner parts 1a and 1b, outer parts 2a and 2b, and assemblies 3a and 3b of the inner parts 1a and 1b and the outer part 2a and 2b of the trunk lid and the tail gate at the home positions, respectively.

That is, in FIG. 1, the loading jig apparatus 100 commonly used may position and align the respective inner parts 1a and 1b of the trunk lid and the tail gate at the home position in common. In FIG. 2, the loading jig apparatus 200 commonly used may position and align the respective outer parts 2a and 2b of the trunk lid and the tail gate at the home position in common. Further, in FIG. 3, the loading jig apparatus 300 commonly used may position and align the respective assemblies 3a and 3b of the trunk lid and the tail gate at the home position in common.

Hereinafter, the respective inner parts 1a and 1b, the respective outer parts 2a and 2b, and the respective assemblies 3a and 3b of the trunk lid and the tail gate may be defined as vehicle body panels, and general directions in the specification may be defined as left and right directions, front and rear directions and up and down directions on the basis of both left and right sides, and front and rear sides of the vehicle body panel.

In the industrial field, a transfer direction of the vehicle body, a width direction of the vehicle body, and a height direction of the vehicle body are referred to as a T direction, an L direction, and an H direction, respectively, but the exemplary embodiment of the present invention will be described on the basis of the front and rear directions, the left and right directions, and the up and down directions instead of the LTH directions.

Various constituent elements of the loading jig apparatuses 100, 200, and 300 commonly used for a trunk lid and a tail gate according to the exemplary embodiment of the present invention, which will be described below, may be configured on a jig frame 10.

The jig frame 10 serves to substantially support various constituent elements of the present apparatuses 100, 200, and 300, and is provided with accessory elements such as various brackets, support blocks, and collars for supporting the constituent elements.

The loading jig apparatuses 100, 200, and 300 commonly used for a trunk lid and a tail gate according to the exemplary embodiment of the present invention are made of a structure that may align and position the respective inner parts 1a and 1b, the respective outer parts 2a and 2b, and the respective assemblies 3a and 3b as vehicle body panels of the trunk lid and the tail gate, which are different in accordance with the types of vehicles, at the home position in common.

To this end, the loading jig apparatuses 100, 200, and 300 commonly used for a trunk lid and a tail gate according to the exemplary embodiment of the present invention basically include first moving units 110, 210, and 310 installed on the jig frame 10, first support units 120, 220, and 320, second support units 140, 240, and 340, second moving units 160, 260, and 360, and third support units 180, 280, and 380.

Hereinafter, a configuration of the loading jig apparatus 100 commonly used, which may position and align the respective inner parts of the trunk lid and the tail gate as the vehicle body panels 1a and 1b at the home position in common, will be described with reference to FIG. 1.

Here, the jig frame 10 of FIG. 1 includes a base frame 11, and vertical frames 13 installed on a rear side edge of the base frame 11 in a vertical direction.

Figure 4:
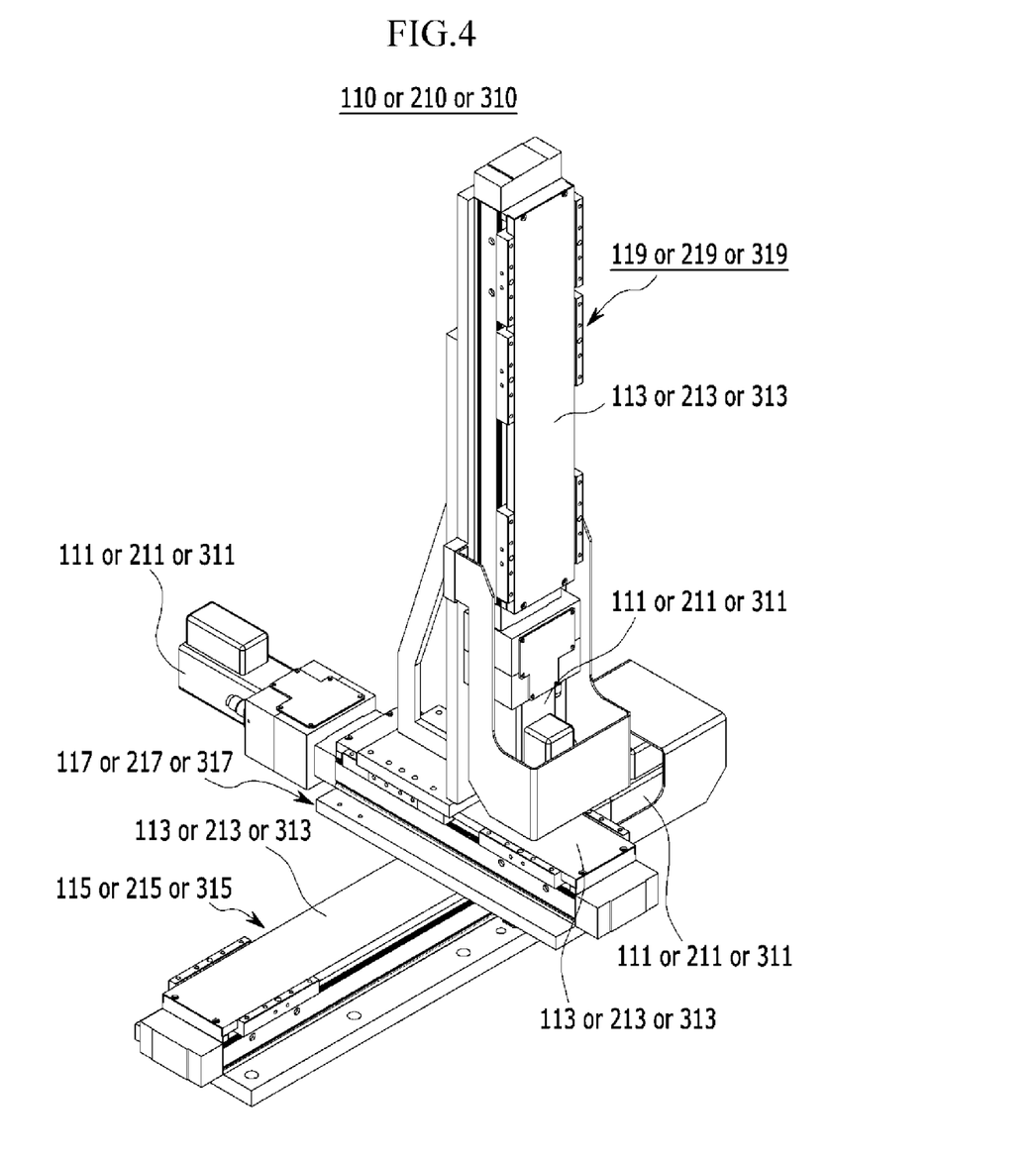
FIG. 4 is a perspective view illustrating a first moving unit that is applied to the loading jig apparatus commonly used for a trunk lid and a tail gate according to the exemplary embodiment of the present invention.

FIG. 4 is a perspective view illustrating the first moving unit that is applied to the loading jig apparatus commonly used for a trunk lid and a tail gate according to the exemplary embodiment of the present invention.

Referring to FIGS. 1 and 4, in the exemplary embodiment of the present invention, the first moving unit 110 is an electrically driven unit which is moved in three axis directions, that is, up and down directions, left and right directions, and front and rear directions, and may be installed on the vertical frames 13 of the jig frame 10 as a pair of first moving units 110 so as to correspond to both left and right sides of the vehicle body panels 1a and 1b.

The first moving unit 110 has a structure in which three axis first, second, and third moving members 115, 117, and 119 including a drive motor 111, and an LM module 113 are combined in the left and right directions, the front and rear directions, and the up and down directions.

Here, the LM module 113 may be provided as an LM guide including a housing, a guide rail, a guide block, and a lead screw.

Further, in the three axis first, second, and third moving members 115, 117, and 119, the first moving member 115 may be disposed on the vertical frame 13 in the up and down directions, the second moving member 117 may be coupled to the first moving member 115 in the left and right direction, and the third moving member 119 may be coupled to the second moving member 117 in the front and rear direction.

Because the three axis first, second, and third moving members 115, 117, and 119 are configured as an LM moving apparatus that is a publicly known technology widely known in this industrial field, a more detailed description of the configuration thereof will be omitted in the present specification.

Referring to FIGS. 1 and 4, in the exemplary embodiment of the present invention, the first support units 120 serve to support both left and right sides of the vehicle body panels 1a and 1b, and may be installed on the respective third moving members 119 of the first moving units 110.

The first support units 120 include first guiders 121 which align both left and right side portions of the vehicle body panels 1a and 1b, and first roller attachments 125 which support both left and right side portions.

The first guiders 121 are mounted to the third moving members 119 of the first moving units 110 by first mounting brackets 123, and provided as bar-shaped guide bars which align (guide) both left and right side portions of the vehicle body panels 1a and 1b.

Further, the first roller attachments 125 are attachment rollers which come into contact with both left and right side portions of the vehicle body panels 1a and 1b and rotate, and rotatably installed on the first mounting brackets 123.

Here, the first roller attachments 125 come into point contact or line contact with both left and right side portions of the vehicle body panels 1a and 1b and rotate, and may come into contact with both left and right side portions of the vehicle body panels 1a and 1b and rotate when the vehicle body panels 1a and 1b are loaded in the weight direction of the vehicle body panels 1a and 1b.

That is, when the vehicle body panels 1a and 1b are loaded in the weight direction of the vehicle body panels 1a and 1b, both left and right side portions of the vehicle body panels 1a and 1b are guided by the first roller attachments 125 in the weight direction of the vehicle body panels 1a and 1b such that the vehicle body panels 1a and 1b may be aligned at the home position.

Referring to FIG. 1, in the exemplary embodiment of the present invention, the second support units 140 serve to support front sides of the vehicle body panels 1a and 1b, and are installed on the base frame 11 of the jig frame 10 so as to correspond to the front sides of the vehicle body panels 1a and 1b.

The second support units 140 are mounted on a front side of the base frame 11, and may include a pair of first guide attachments 141 which supports the front sides of the vehicle body panels 1a and 1b.

The first guide attachments 141 may be mounted on first fixing brackets 143 that are disposed at the front side of the base frame 11 in the vertical direction. Furthermore, the first guide attachments 141 may be fixedly installed at upper end sides of the first fixing brackets 143 by second mounting brackets 145.

Figure 5:
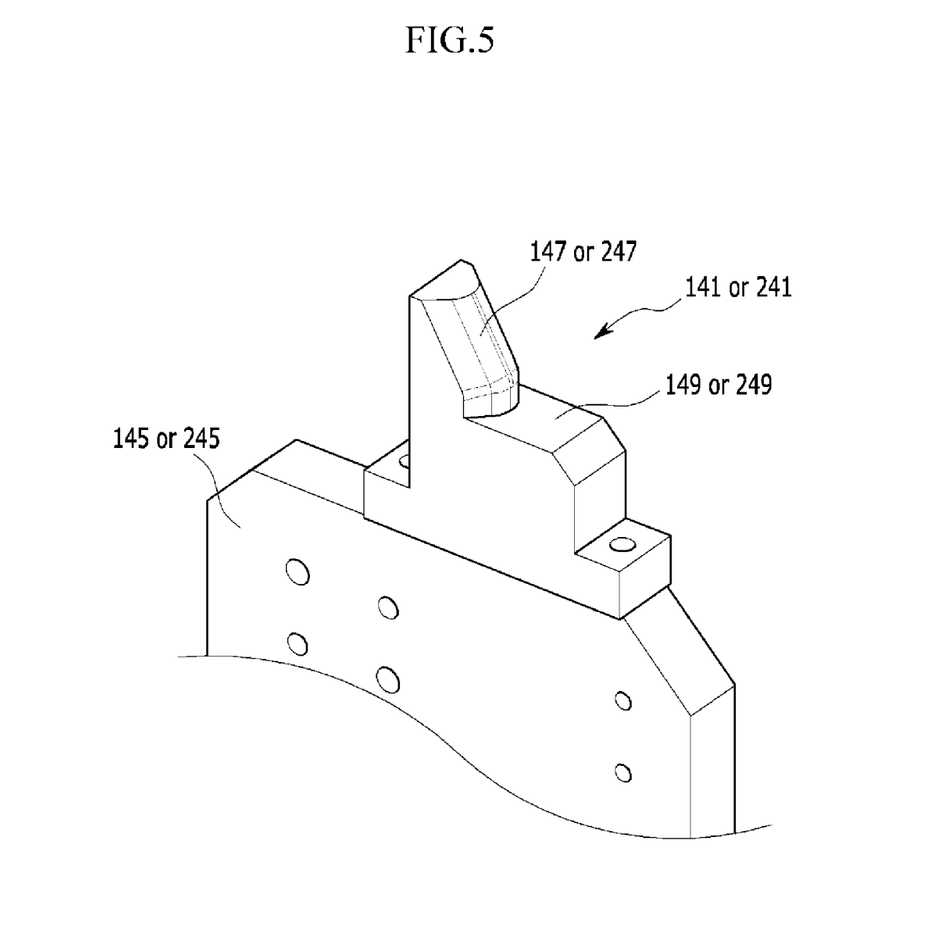
FIG. 5 is a view illustrating a first guide attachment that is applied to the loading jig apparatus commonly used for a trunk lid and a tail gate according to the exemplary embodiment of the present invention.

FIG. 5 is a view illustrating the first guide attachment that is applied to the loading jig apparatus commonly used for a trunk lid and a tail gate according to the exemplary embodiment of the present invention.

Referring to FIGS. 1 and 5, a first guide surface 147, which aligns the front sides of the vehicle body panels 1a and 1b in the weight direction of the vehicle body panels 1a and 1b, is formed at the first guide attachment 141 so as to be inclined, and a second guide surface 149, which supports the front sides of the vehicle body panels 1a and 1b in a horizontal direction at a lower side of the first guide surface 147, is formed to be flat.

Here, the first guide surface 147 comes into point contact or line contact with the front sides of the vehicle body panels 1a and 1b, and is formed as a round-shaped spherical surface along the inclined direction thereof so that the front sides of the vehicle body panels 1a and 1b may be guided along the inclined direction.

Further, the second guide surface 149 has a flat surface along the horizontal direction at the lower side of the first guide surface 147 so that the front sides of the vehicle body panels 1a and 1b may come into surface contact with the second guide surface 149.

Figure 6:
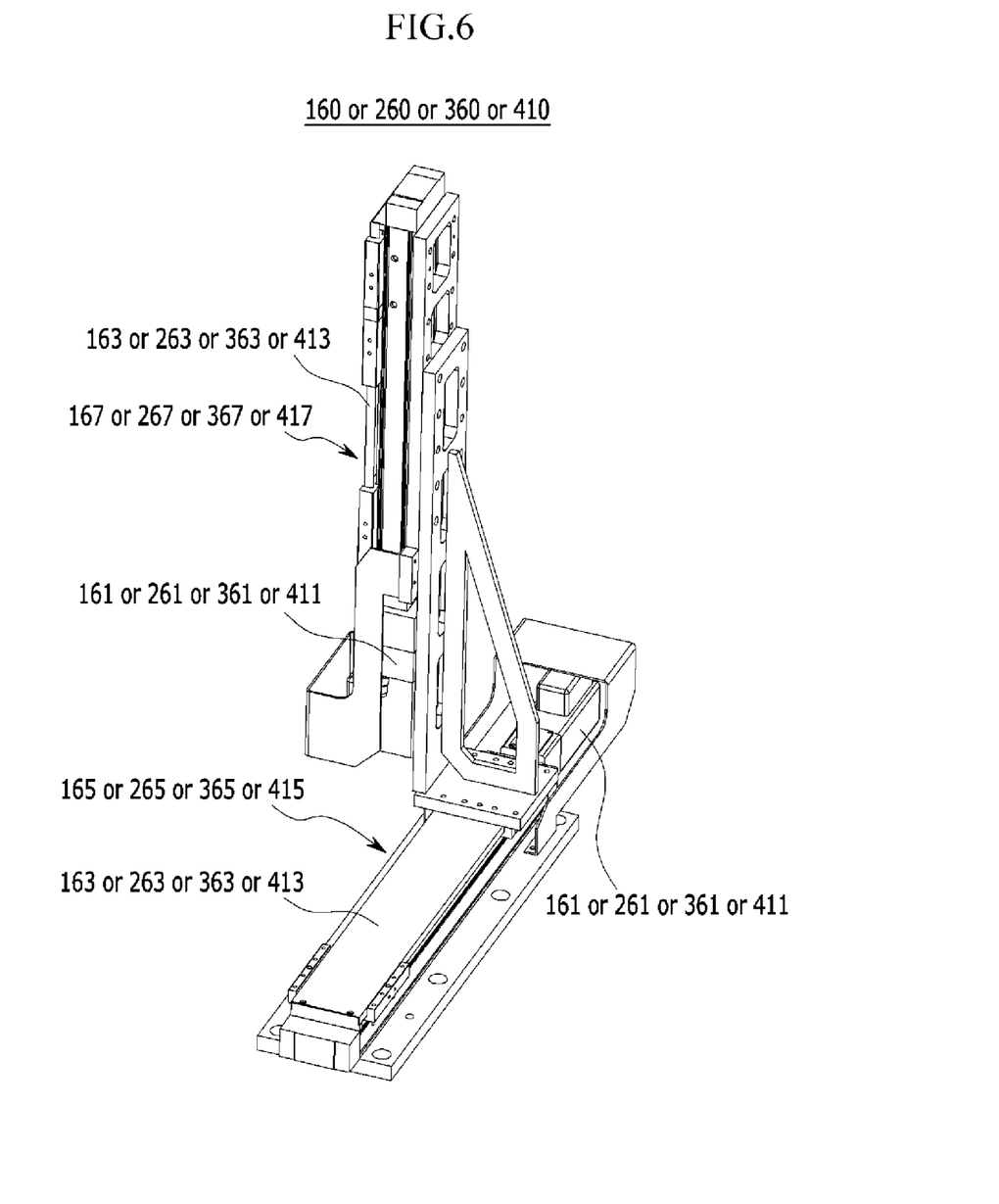
FIG. 6 is a perspective view illustrating a second moving unit and a third moving unit that are applied to the loading jig apparatus commonly used for a trunk lid and a tail gate according to the exemplary embodiment of the present invention.

FIG. 6 is a perspective view illustrating the second moving unit and the third moving unit that are applied to the loading jig apparatus commonly used for a trunk lid and a tail gate according to the exemplary embodiment of the present invention.

Referring to FIGS. 1 and 6, in the exemplary embodiment of the present invention, the second moving unit 160 is an electrically driven unit which is moved in two axis directions, that is, the up and down directions, and the front and rear directions, and may be installed on the vertical frame 13 of the jig frame 10 between the pair of the first moving units 110 so as to correspond to the rear sides of the vehicle body panels 1a and 1b.

The second moving unit 160 has a structure in which two axis first and second moving members 165 and 167 including a drive motor 161, and an LM module 163 are combined in the up and down directions, and the front and rear directions.

Here, the LM module 163 may be provided as an LM guide including a housing, a guide rail, a guide block, and a lead screw.

Further, in the two axis first and second moving members 165 and 167, the first moving member 165 may be disposed on the vertical frame 13 in the up and down directions, and the second moving member 167 may be coupled to the first moving member 165 in the front and rear direction.

Because the two axis first and second moving members 165 and 167 are configured as an LM moving apparatus that is a publicly known technology widely known in this industrial field, a more detailed description of the configuration thereof will be omitted in the present specification.

Referring to FIGS. 1 and 6, in the exemplary embodiment of the present invention, the third support unit 180 serves to support the rear sides of the vehicle body panels 1a and 1b, and may be installed on the second moving member 167 of the second moving unit 160.

Figure 7:
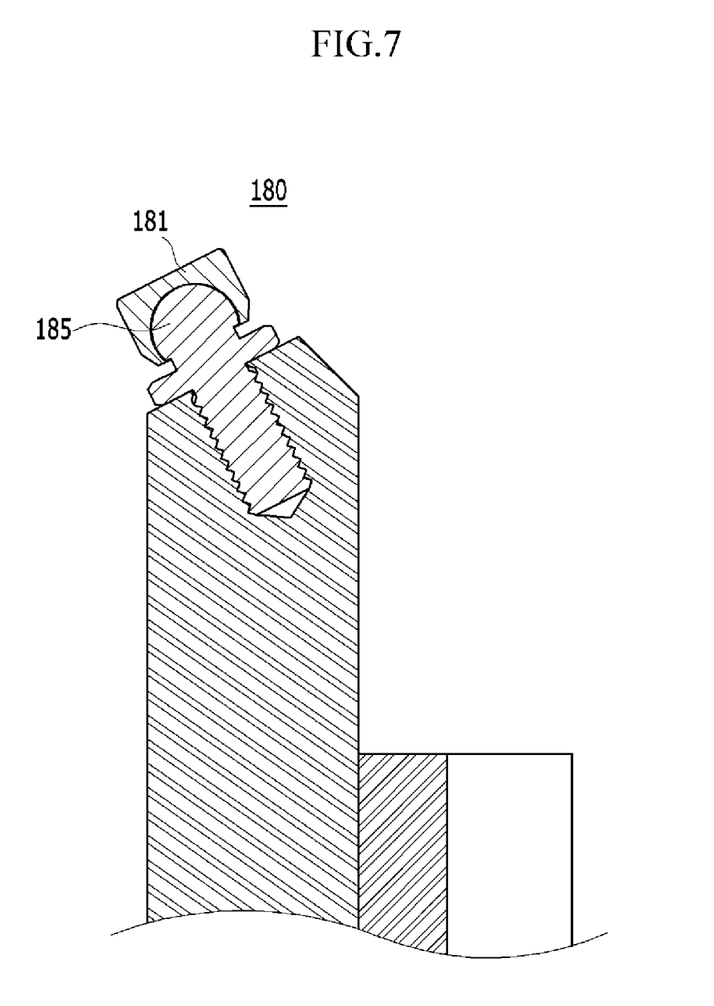
FIG. 7 is a cross-sectional configuration view illustrating a swivel pad that is applied to the loading jig apparatus commonly used for a trunk lid and a tail gate according to the exemplary embodiment of the present invention.

As illustrated in FIGS. 1 and 7, the third support unit 180 includes a pair of swivel pads 181 which swivelably supports cross sections of the rear sides of the vehicle body panels 1a and 1b so as to correspond to rear side cross-sectional angles of vehicle body panels 1a and 1b.

The swivel pads 181 may be mounted, respectively, on both sides of a second fixing bracket 183 that is disposed on the second moving member 167 of the second moving unit 160 in both side directions (left and right directions) of the vehicle body panels 1a and 1b.

The swivel pads 181 may be provided to be swivelable by ball joints 185, which are installed at both sides of the second fixing bracket 183, so as to correspond to the rear side cross-sectional angles of the vehicle body panels 1a and 1b.

That is, the swivel pads 181 are swivelably rotated by the ball joints 185 so as to correspond to the rear side cross-sectional angles of the vehicle body panels 1a and 1b, which are different in accordance with the types of vehicles, such that swivel pads 181 are displaced to be parallel to the rear side cross sections of the vehicle body panels 1a and 1b so as to absorb differences in cross-sectional angles, thereby aligning the rear sides of the vehicle body panels 1a and 1b.

Hereinafter, an operation of positioning and aligning the vehicle body panels 1a and 1b as the respective inner parts of the trunk lid and the tail gate at the home position in common by using the loading jig apparatus 100 commonly used for a trunk lid and a tail gate according to the exemplary embodiment of the present invention, which is configured as described above, will be described with reference to the aforementioned drawings.

First, in the exemplary embodiment of the present invention, the vehicle body panels 1a and 1b, which are manufactured in the vehicle body sub-assemble line so as to be different in size or shape in accordance with the types of vehicles, are transferred by a robot hanger (not illustrated in the drawings) or the like to a line in which the trunk lid and the tail gate are produced.

The vehicle body panels 1a and 1b, which are transferred by the robot hanger or the like as described above, are loaded on the loading jig apparatus 100 commonly used according to the exemplary embodiment of the present invention, and in the exemplary embodiment of the present invention, the positions of the first and third support units 120 and 180 are adjusted by the first moving units 110 and the second moving unit 160 so as to correspond to the sizes and shapes of the vehicle body panels 1a and 1b, which are different in accordance with the types of vehicles. The aforementioned operation is possible by teaching corrections by a control mechanism with respect to the first and second moving units 110 and 160 using a separate controller.

Here, the first moving units 110 may move the first support units 120 in the three axis directions (the left and right directions, the front and rear directions, and the up and down directions) so as to correspond to the sizes and shapes of the vehicle body panels 1a and 1b. Further, the second moving unit 160 may move the third support unit 180 in the two axis directions (the up and down directions, and the front and rear directions) so as to correspond to the sizes and shapes of the vehicle body panels 1a and 1b.

In this state, in the exemplary embodiment of the present invention, the vehicle body panels 1a and 1b are unloaded, by the robot hanger, on the first support units 120, the second support units 140, and the third support unit 180 on the jig frame 10.

Then, the first guiders 121 of the first support units 120 guide and align both left and right side portions of the vehicle body panels 1a and 1b. In addition, when the vehicle body panels 1a and 1b are loaded in the weight direction of the vehicle body panels 1a and 1b, the first roller attachments 125 of the first support units 120 come into contact with both left and right side portions of the vehicle body panels 1a and 1b and rotate so as to guide and align both left and right side portions in the weight direction of the vehicle body panels 1a and 1b.

During this process, the first guide attachments 141 of the second support units 140 support the front sides of the vehicle body panels 1a and 1b.

Here, when the vehicle body panels 1a and 1b are loaded in the weight direction of the vehicle body panels 1a and 1b, the first guide attachments 141 may guide and align the front sides of the vehicle body panels 1a and 1b along the inclined direction of the spherical surfaces through the spherical surfaces of the first guide surfaces 147, and may align the front sides of the vehicle body panels 1a and 1b in the horizontal direction along the flat surfaces of the second guide surfaces 149.

In addition, in the exemplary embodiment of the present invention, the rear sides of the vehicle body panels 1a and 1b may be aligned by the swivel pads 181 of the third support unit 180.

In this case, the swivel pads 181 are swivelably rotated by the ball joints 185 so as to correspond to the rear side cross-sectional angles of the vehicle body panels 1a and 1b, which are different in accordance with types of vehicles, such that swivel pads 181 are displaced to be parallel to the rear side cross sections of the vehicle body panels 1a and 1b so as to absorb differences in cross-sectional angles, thereby aligning the rear sides of the vehicle body panels 1a and 1b.

Therefore, according to the loading jig apparatus 100 commonly used according to the exemplary embodiment of the present invention, the positions of the first and third support units 120 and 180 may be adjusted by the first moving units 110 and the second moving unit 160 so as to correspond to the sizes and shapes of the vehicle body panels 1a and 1b, which are different in accordance with the types of vehicles.

In addition, according to the loading jig apparatus 100 commonly used according to the exemplary embodiment of the present invention, the vehicle body panels 1a and 1b, which are inner parts of the trunk lid and the tail gate that are different in accordance with the types of vehicles, may be positioned and aligned at the home position in common by the first to third support units 120, 140, and 180.

Accordingly, in the exemplary embodiment of the present invention, the vehicle body panels 1a and 1b, which are inner parts of the trunk lid and the tail gate that are different in accordance with the types of vehicles, may be positioned and aligned at the home position in common, thereby improving performance of flexible manufacturing for various types of vehicles.

Furthermore, in the exemplary embodiment of the present invention, the inner parts of the trunk lid and the tail gate, which have different shapes and sizes, respectively, in accordance with types of vehicles, may be positioned and aligned at the home position in common, thereby reducing additional investment costs due to modifications or new manufacture of the jig apparatus when applying the jig apparatus to new types of vehicles.

Hereinafter, a configuration of the loading jig apparatus 200 commonly used, which may position and align the respective outer parts of the trunk lid and the tail gate as vehicle body panels 2a and 2b at the home position in common, will be described with reference to FIG. 2.

As described above, the aforementioned loading jig apparatus 200 commonly used includes the jig frame 10, the first moving unit 210, the first support unit 220, the second support unit 240, the second moving unit 260, and the third support unit 280.

Referring to FIGS. 2 and 4, in the exemplary embodiment of the present invention, the first moving unit 210 is an electrically driven unit which is moved in three axis directions, that is, the up and down directions, the left and right directions, and the front and rear directions, and may be installed on the jig frame 10 as a pair of first moving units 210 so as to correspond to both left and right sides of the vehicle body panels 2a and 2b.

The first moving unit 210 has a structure in which three axis first, second, and third moving members 215, 217, and 219 including a drive motor 211, and an LM module 213 are combined in the left and right directions, the front and rear directions, and the up and down directions.

Here, the LM module 213 may be provided as an LM guide including a housing, a guide rail, a guide block, and a lead screw.

Further, in the three axis first, second, and third moving members 215, 217, and 219, the first moving member 215 may be disposed on an upper surface of the jig frame 10 in the front and rear direction, the second moving member 217 may be coupled to the first moving member 215 in the left and right direction, and the third moving member 219 may be coupled to the second moving member 217 in the up and down directions.

Because the three axis first, second, and third moving members 215, 217, and 219 are configured as an LM moving apparatus that is a publicly known technology widely known in this industrial field, a more detailed description of the configuration thereof will be omitted in the present specification.

Referring to FIGS. 2 and 4, in the exemplary embodiment of the present invention, the first support units 220 serve to support both left and right sides of the vehicle body panels 2a and 2b, and may be installed on the respective third moving members 219 of the first moving units 210.

The first support units 220 include first guiders 221 which align both left and right side portions of the vehicle body panels 2a and 2b, and first roller attachments 225 which support both left and right side portions.

The first guiders 221 are mounted to the third moving members 219 of the first moving units 210 by first mounting brackets 223, and provided as bar-shaped guide bars which align (guide) both left and right side portions of the vehicle body panels 2a and 2b.

Further, the first roller attachments 225 are attachment rollers which come into contact with both left and right side portions of the vehicle body panels 2a and 2b and rotate, and rotatably installed on the first mounting brackets 223.

Here, the first roller attachments 225 come into point contact or line contact with both left and right side portions of the vehicle body panels 2a and 2b and rotate, and may come into contact with both left and right side portions of the vehicle body panels 2a and 2b and rotate when the vehicle body panels 2a and 2b are loaded in the weight direction of the vehicle body panels 2a and 2b.

That is, when the vehicle body panels 2a and 2b are loaded in the weight direction of the vehicle body panels 2a and 2b, both left and right side portions of the vehicle body panels 2a and 2b are guided by the first roller attachments 225 in the weight direction of the vehicle body panels 2a and 2b such that the vehicle body panels 2a and 2b may be aligned at the home position.

Referring to FIG. 2, in the exemplary embodiment of the present invention, the second support units 240 serve to support front sides of the vehicle body panels 2a and 2b, and are installed on the jig frame 10 so as to correspond to the front sides of the vehicle body panels 2a and 2b.

The second support units 240 are mounted on a front side of the jig frame 10, and may include a pair of first guide attachments 241 which supports the front sides of the vehicle body panels 2a and 2b.

The second guide attachment 241 may be mounted on first fixing brackets 243 that are disposed at the front side of the jig frame 10 in the vertical direction. Furthermore, the first guide attachments 241 may be fixedly installed at upper end sides of the first fixing brackets 243 by second mounting brackets 245.

Referring to FIGS. 2 and 5, a first guide surface 247, which aligns the front sides of the vehicle body panels 2a and 2b in the weight direction of the vehicle body panels 2a and 2b, is formed at the first guide attachment 241 so as to be inclined, and a second guide surface 249, which supports the front sides of the vehicle body panels 2a and 2b in a horizontal direction at a lower side of the first guide surface 247, is formed to be flat.

Here, the first guide surface 247 comes into point contact or line contact with the front sides of the vehicle body panels 2a and 2b, and is formed as a round-shaped spherical surface along the inclined direction thereof so that the front sides of the vehicle body panels 2a and 2b may be guided along the inclined direction.

Further, the second guide surface 249 has a flat surface along the horizontal direction at the lower side of the first guide surface 247 so that the front sides of the vehicle body panels 2a and 2b may come into surface contact with second guide surface 249.

Referring to FIGS. 2 and 6, in the exemplary embodiment of the present invention, the second moving unit 260 is an electrically driven unit which is moved in two axis directions, that is, the up and down directions, and the front and rear directions, and may be installed on the jig frame 10 as a pair of second moving units 260 so as to correspond to the rear sides of the vehicle body panels 2a and 2b.

The second moving unit 260 has a structure in which two axis first and second moving members 265 and 267 including a drive motor 261, and an LM module 263 are combined in the up and down directions, and the front and rear directions.

Here, the LM module 263 may be provided as an LM guide including a housing, a guide rail, a guide block, and a lead screw.

Further, in the two axis first and second moving members 265 and 267, the first moving member 265 may be disposed on the upper surface of the jig frame 10 in the front and rear directions, and the second moving member 267 may be coupled to the first moving member 265 in the up and down directions.

Because the two axis first and second moving members 265 and 267 are configured as an LM moving apparatus that is a publicly known technology widely known in this industrial field, a more detailed description of the configuration thereof will be omitted in the present specification.

Referring to FIG. 2, in the exemplary embodiment of the present invention, the third support units 280 serve to support the rear sides of the vehicle body panels 2a and 2b, and may be installed on the second moving members 267 of the second moving units 260.

The third support units 280 are fixedly mounted to the second moving members 267 of the second moving units 260 by third mounting brackets 283, respectively, and include second guide attachments 281 which support the rear sides of the vehicle body panels 2a and 2b.

Figure 8:
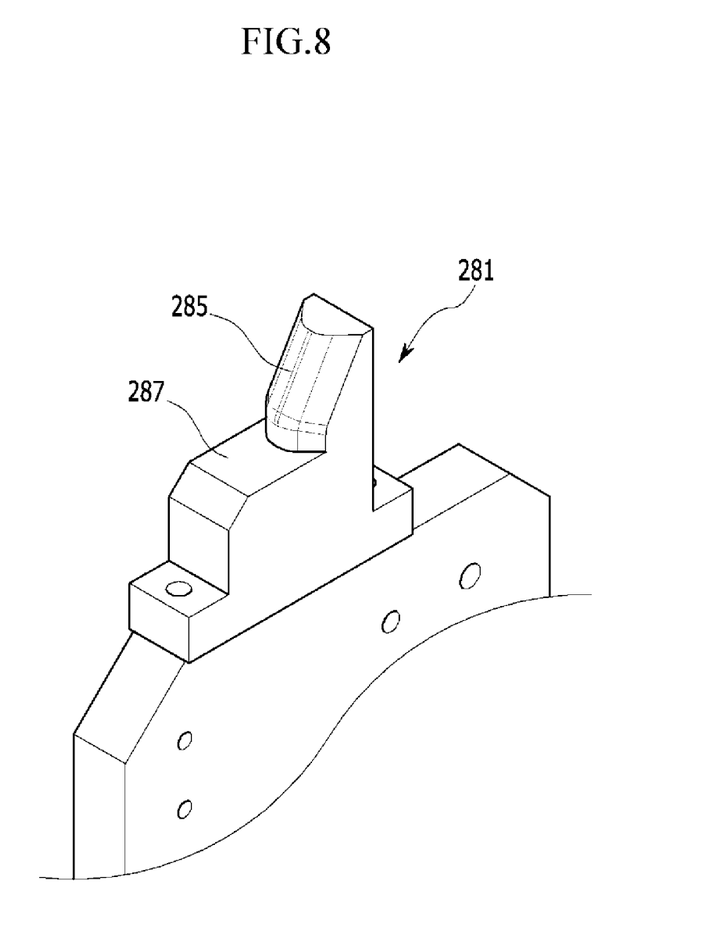
FIG. 8 is a view illustrating a second guide attachment that is applied to the loading jig apparatus commonly used for a trunk lid and a tail gate according to the exemplary embodiment of the present invention.

FIG. 8 is a view illustrating the second guide attachment that is applied to the loading jig apparatus commonly used for a trunk lid and a tail gate according to the exemplary embodiment of the present invention.

Referring to FIGS. 2 and 8, in the exemplary embodiment of the present invention, a third guide surface 285, which aligns the rear sides of the vehicle body panels 2a and 2b in the weight direction of the vehicle body panels 2a and 2b, is formed at the second guide attachment 281 so as to be inclined, and a fourth guide surface 287, which supports the rear sides of the vehicle body panels 2a and 2b in the horizontal direction at a lower side of the third guide surface 285, is formed to be flat.

Here, the third guide surface 285 comes into point contact or line contact with the rear sides of the vehicle body panels 2a and 2b, and is formed as a round-shaped spherical surface along the inclined direction thereof so that the rear sides of the vehicle body panels 2a and 2b may be guided along the inclined direction.

Further, the fourth guide surface 287 has a flat surface along the horizontal direction at the lower side of the third guide surface 285 so that the rear sides of the vehicle body panels 2a and 2b may come into surface contact with the fourth guide surface 287.

Hereinafter, an operation of positioning and aligning the vehicle body panels 2a and 2b as the respective outer parts of the trunk lid and the tail gate at the home position in common by using the loading jig apparatus 200 commonly used for a trunk lid and a tail gate according to the exemplary embodiment of the present invention, which is configured as described above, will be described with reference to the aforementioned drawings.

First, in the exemplary embodiment of the present invention, the vehicle body panels 2a and 2b, which are manufactured in the vehicle body sub-assembly line so as to be different in size or shape in accordance with the types of vehicles, are transferred by a robot hanger (not illustrated in the drawings) or the like to a line in which the trunk lid and the tail gate are produced.

The vehicle body panels 2a and 2b, which are transferred by the robot hanger or the like as described above, are loaded on the loading jig apparatus 200 commonly used according to the exemplary embodiment of the present invention, and in the exemplary embodiment of the present invention, the positions of the first and third support units 220 and 280 are adjusted by the first moving units 210 and the second moving units 260 so as to correspond to the sizes and shapes of the vehicle body panels 2a and 2b, which are different in accordance with the types of vehicles. The aforementioned operation is possible by teaching corrections by a control mechanism with respect to the first and second moving units 210 and 260 using a separate controller.

Here, the first moving units 210 may move the first support units 220 in the three axis directions (the left and right directions, the front and rear directions, and the up and down directions) so as to correspond to the sizes and the shapes of the vehicle body panels 2a and 2b. Further, the second moving units 260 may move the third support units 280 in the two axis directions (the up and down directions, and the front and rear directions) so as to correspond to the sizes and the shapes of the vehicle body panels 2a and 2b.

In this state, in the exemplary embodiment of the present invention, the vehicle body panels 2a and 2b are unloaded, by the robot hanger, on the first support units 220, the second support units 240, and the third support units 280 on the jig frame 10.

Then, the first guiders 221 of the first support units 220 guide and align both left and right side portions of the vehicle body panels 2a and 2b. In addition, when the vehicle body panels 2a and 2b are loaded in the weight direction of the vehicle body panels 2a and 2b, the first roller attachments 225 of the first support units 220 come into contact with both left and right side portions of the vehicle body panels 2a and 2b and rotate so as to guide and align both left and right side portions in the weight direction of the vehicle body panels 2a and 2b.

During this process, the first guide attachments 241 of the second support units 240 support the front sides of the vehicle body panels 2a and 2b.

Here, the vehicle body panels 2a and 2b are loaded in the weight direction of the vehicle body panels 2a and 2b, the first guide attachments 241 may guide and align the front sides of the vehicle body panels 2a and 2b along the inclined direction of the spherical surfaces through the spherical surfaces of the first guide surfaces 247, and may align the front sides of the vehicle body panels 2a and 2b in the horizontal direction along the flat surfaces of the second guide surfaces 249.

In addition, in the exemplary embodiment of the present invention, the rear sides of the vehicle body panels 2a and 2b may be aligned by the second guide attachments 281 of the third support units 280.

In this case, when the vehicle body panels 2a and 2b are loaded in the weight direction of the vehicle body panels 2a and 2b, the second guide attachments 281 may guide and align the rear sides of the vehicle body panels 2a and 2b along the inclined direction of the spherical surfaces through the spherical surfaces of the third guide surfaces 285, and may align the rear sides of the vehicle body panels 2a and 2b in the horizontal direction along the flat surfaces of the fourth guide surfaces 287.

Therefore, according to the loading jig apparatus 200 commonly used according to the exemplary embodiment of the present invention, the positions of the first and third support units 220 and 280 may be adjusted by the first moving units 210 and the second moving units 260 so as to correspond to the sizes and shapes of the vehicle body panels 2a and 2b, which are different in accordance with the types of vehicles.

In addition, according to the loading jig apparatus 200 commonly used according to the exemplary embodiment of the present invention, the vehicle body panels 2a and 2b, which are outer parts of the trunk lid and the tail gate that are different in accordance with the types of vehicles, may be positioned and aligned at the home position in common by the first to third support units 220, 240, and 280.

Accordingly, in the exemplary embodiment of the present invention, the vehicle body panels 2a and 2b, which are outer parts of the trunk lid and the tail gate that are different in accordance with the types of vehicles, may be positioned and aligned at the home position in common, thereby improving performance of flexible manufacturing for various types of vehicles.

Furthermore, in the exemplary embodiment of the present invention, the outer parts of the trunk lid and the tail gate, which have different shapes and sizes, respectively, in accordance with the types of vehicles, may be positioned and aligned at the home position in common, thereby reducing additional investment costs due to modifications or new manufacture of the jig apparatus when applying the jig apparatus to new types of vehicles.

Hereinafter, a configuration of the loading jig apparatus 300 commonly used, which may position and align the respective assemblies in which the inner parts and the outer parts of the trunk lid and the tail gate are assembled as vehicle body panels 3a and 3b at the home position in common, will be described with reference to FIG. 3.

As described above, the aforementioned loading jig apparatus 300 commonly used basically includes the jig frame 10, the first moving unit 310, the first support unit 320, the second support unit 340, the second moving unit 360, and the third support unit 380, and further includes a third moving unit 410, and a fourth support unit 430.

Referring to FIGS. 3 and 4, in the exemplary embodiment of the present invention, the first moving unit 310 is an electrically driven unit which is moved in three axis directions, that is, the up and down directions, the left and right directions, and the front and rear directions, and may be installed on the jig frame 10 as a pair of first moving units 310 so as to correspond to both left and right sides of the vehicle body panels 3a and 3b.

The first moving unit 310 has a structure in which three axis first, second, and third moving members 315, 317, and 319 including a drive motor 311, and an LM module 313 are combined in the left and right directions, the front and rear directions, and the up and down directions.

Here, the LM module 313 may be provided as an LM guide including a housing, a guide rail, a guide block, and a lead screw.

Further, in the three axis first, second, and third moving members 315, 317, and 319, the first moving member 315 may be disposed on an upper surface of the jig frame 10 in the front and rear directions, the second moving member 317 may be coupled to the first moving member 315 in the left and right directions, and the third moving member 319 may be coupled to the second moving member 317 in the up and down directions.

Because the three axis first, second, and third moving members 315, 317, and 319 are configured as an LM moving apparatus that is a publicly known technology widely known in this industrial field, a more detailed description of the configuration thereof will be omitted in the present specification.

Referring to FIGS. 3 and 4, in the exemplary embodiment of the present invention, the first support units 320 include first guiders 321 which align both left and right side portions of the vehicle body panels 3a and 3b.

The first guiders 321 are mounted to the third moving members 319 of the first moving units 310 by first mounting brackets 323, and provided as bar-shaped guide bars which align (guide) both left and right side portions of the vehicle body panels 3a and 3b.

Referring to FIG. 3, in the exemplary embodiment of the present invention, the second support units 340 serve to support front sides of the vehicle body panels 3a and 3b, and are installed on the jig frame 10 so as to correspond to the front sides of the vehicle body panels 3a and 3b.

The second support units 340 include a pair of second guiders 341 and a pair of second roller attachments 347 which are mounted on the jig frame 10, respectively, so as to correspond to the front sides of the vehicle body panels 3a and 3b.

The second guiders 341 serve to align the front sides of the vehicle body panels 3a and 3b, and may be mounted on first fixing brackets 343 which are disposed at the front side of the jig frame 10 in the vertical direction. Furthermore, the second guiders 341 may be fixedly installed at upper end sides of the first fixing brackets 343 by second mounting brackets 345.

The second guiders 341 are provided as bar-shaped guide bars which align (guide) the front sides of the vehicle body panels 3a and 3b.

Further, the second roller attachments 347 serve to substantially support the front sides of the vehicle body panels 3a and 3b, are rotatably installed on the second mounting brackets 345, and are provided as attachment rollers which come into contact with the front sides of the vehicle body panels 3a and 3b and rotate.

Here, the second roller attachments 347 come into point contact or line contact with the front sides of the vehicle body panels 3a and 3b and rotate, and may come into contact with the front sides of the vehicle body panels 3a and 3b and rotate when the vehicle body panels 3a and 3b are loaded in the weight direction of the vehicle body panels 3a and 3b.

That is, when the vehicle body panels 3a and 3b are loaded in the weight direction of the vehicle body panels 3a and 3b, front portions of the vehicle body panels 3a and 3b are guided by the second roller attachments 347 in the weight direction of the vehicle body panels 3a and 3b such that the front portions of the vehicle body panels 3a and 3b may be aligned at the home position.

Referring to FIGS. 3 and 6, in the exemplary embodiment of the present invention, the second moving unit 360 is an electrically driven unit which is moved in two axis directions, that is, the up and down directions, and the front and rear directions, and may be installed on the jig frame 10 as a pair of second moving units 360 so as to correspond to the rear sides of the vehicle body panels 3a and 3b.

The second moving unit 360 has a structure in which two axis first and second moving members 365 and 367 including a drive motor 361, and an LM module 363 are combined in the up and down directions, and the front and rear directions.

Here, the LM module 363 may be provided as an LM guide including a housing, a guide rail, a guide block, and a lead screw.

Further, in the two axis first and second moving members 365 and 367, the first moving member 365 may be disposed on an upper surface of the jig frame 10 in the front and rear directions, and the second moving member 367 may be coupled to the first moving member 365 in the up and down directions.

Because the two axis first and second moving members 365 and 367 are configured as an LM moving apparatus that is a publicly known technology widely known in this industrial field, a more detailed description of the configuration thereof will be omitted in the present specification.

Referring to FIG. 3, in the exemplary embodiment of the present invention, the third support units 380 serve to support the rear sides of the vehicle body panels 3a and 3b, and may be installed on the second moving members 367 of the second moving units 360.

The third support units 380 include a pair of third guiders 381 and a pair of third roller attachments 387 which are mounted on the second moving members 367 of the second moving units 360, respectively.

The third guiders 381 serve to align the rear sides of the vehicle body panels 3a and 3b, and may be installed on the second moving members 367 of the second moving units 360 by third mounting brackets 383.

The third guiders 381 are provided as bar-shaped guide bars which align (guide) the rear sides of the vehicle body panels 3a and 3b.

Further, the third roller attachments 387 serve to substantially support the rear sides of the vehicle body panels 3a and 3b, are rotatably installed on the third mounting bracket 383, and are provided as attachment rollers which come into contact with the rear sides of the vehicle body panels 3a and 3b and rotate.

Here, the third roller attachments 387 come into point contact or line contact with the rear sides of the vehicle body panels 3a and 3b and rotate, and may come into contact with the rear sides of the vehicle body panels 3a and 3b and rotate when the vehicle body panels 3a and 3b are loaded in the weight direction of the vehicle body panels 3a and 3b.

That is, when the vehicle body panels 3a and 3b are loaded in the weight direction of the vehicle body panels 3a and 3b, rear portions of the vehicle body panels 3a and 3b are guided by the third roller attachments 387 in the weight direction of the vehicle body panels 3a and 3b such that the rear portions of the vehicle body panels 3a and 3b may be aligned at the home position.

Meanwhile, referring to FIGS. 3 and 6, in the exemplary embodiment of the present invention, the third moving unit 410 is an electrically driven unit which is moved in two axis directions, that is, the up and down directions, and the front and rear directions, and may be installed on the jig frame 10 so as to correspond to a central side of a skin surface of the vehicle body panels 3a and 3b. In this case, the third moving unit 410 may be installed on the upper surface of the jig frame 10 so as to correspond to the central side of the skin surface of the vehicle body panels 3a and 3b between the pair of second moving units 360.

The third moving unit 410 has a structure in which two axis first and second moving members 415 and 417 including a drive motor 411, and an LM module 413 are combined in the up and down directions, and the front and rear directions.

Here, the LM module 413 may be provided as an LM guide including a housing, a guide rail, a guide block, and a lead screw.

Further, in the two axis first and second moving members 415 and 417, the first moving member 415 may be disposed on an upper surface of the jig frame 10 in the front and rear directions, and the second moving member 417 may be coupled to the first moving member 415 in the up and down directions.

Because the two axis first and second moving members 415 and 417 are configured as an LM moving apparatus that is a publicly known technology widely known in this industrial field, a more detailed description of the configuration thereof will be omitted in the present specification.

Referring to FIG. 3, in the exemplary embodiment of the present invention, the fourth support unit 430 serves to support the skin surface of the vehicle body panels 3a and 3b, and may be installed on the second moving member 417 of the third moving unit 410.

The fourth support unit 430 includes fourth roller attachments 431 which substantially support the skin surface of the vehicle body panels 3a and 3b.

The fourth roller attachments 431 are mounted to the second moving member 417 of the third moving unit 410 by a third fixing bracket 433. The third fixing bracket 433 is mounted on the second moving member 417 of the third moving unit 410 in both left and right side directions of the vehicle body panels 3a and 3b, and the fourth roller attachments 431 may be rotatably installed at both sides of the third fixing bracket 433, respectively.

Here, the fourth roller attachments 431 are attachment rollers which come into contact with the skin surface of the vehicle body panels 3a and 3b and rotate, and when the vehicle body panels 3a and 3b are loaded in the weight direction of the vehicle body panels 3a and 3b, the fourth roller attachments 431 may come into contact with the skin surface of the vehicle body panels 3a and 3b and rotate.

That is, when the vehicle body panels 3a and 3b are loaded in the weight direction of the vehicle body panels 3a and 3b, the skin surface is guided by the fourth roller attachments 431 such that the skin surface may be aligned at the home position.

Hereinafter, an operation of positioning and aligning the vehicle body panels 3a and 3b as the respective assemblies in which the inner parts and the outer parts of the trunk lid and the tail gate are assembled at the home position in common by using the loading jig apparatus 300 commonly used for a trunk lid and a tail gate according to the exemplary embodiment of the present invention, which is configured as described above, will be described with reference to the aforementioned drawings.

First, in the exemplary embodiment of the present invention, the vehicle body panels 3a and 3b, which are manufactured in the vehicle body sub-assemble line so as to be different in size or shape in accordance with types of vehicles, are transferred by a robot hanger (not illustrated in the drawings) or the like to a line in which the trunk lid and the tail gate are produced.

The vehicle body panels 3a and 3b, which are transferred by the robot hanger or the like as described above, are loaded on the loading jig apparatus 300 commonly used according to the exemplary embodiment of the present invention, and in the exemplary embodiment of the present invention, the positions of the first, third, and fourth support units 320, 380, and 430 are adjusted by the first moving units 310, the second moving units 360, and the third moving unit 410 so as to correspond to the sizes and shapes of the vehicle body panels 3a and 3b, which are different in accordance with types of vehicles. The aforementioned operation is possible by teaching corrections by a control mechanism with respect to the first moving units 310, the second moving units 360, and the third moving unit 410 using a separate controller.

Here, the first moving units 310 may move the first support units 320 in the three axis directions (the left and right directions, the front and rear directions, and the up and down directions) so as to correspond to the sizes and the shapes of the vehicle body panels 3a and 3b. Further, the second and third moving units 360 and 410 may move the third and fourth support units 380 and 430 in the two axis directions (the up and down directions, and the front and rear directions) so as to correspond to the sizes and the shapes of the vehicle body panels 3a and 3b.

In this state, in the exemplary embodiment of the present invention, the vehicle body panels 3a and 3b are unloaded, by the robot hanger, on the first support units 320, the second support units 340, the third support units 380, and the fourth support unit 430 on the jig frame 10.

Then, the first guiders 321 of the first support units 320 guide and align both left and right side portions of the vehicle body panels 3a and 3b. Further, the second guiders 341 of the second support units 340 align the front sides of the vehicle body panels 3a and 3b.

In addition, when the vehicle body panels 3a and 3b are loaded in the weight direction of the vehicle body panels 3a and 3b, the second roller attachments 347 of the second support units 340 come into contact with the front sides of the vehicle body panels 3a and 3b and rotate so as to guide and align the front portions of the vehicle body panels 3a and 3b in the weight direction of the vehicle body panels 3a and 3b.

During this process, the third guiders 381 of the third support units 380 align the rear sides of the vehicle body panels 3a and 3b. Moreover, when the vehicle body panels 3a and 3b are loaded in the weight direction of the vehicle body panels 3a and 3b, the third roller attachments 387 of the third support units 380 come into contact with the rear sides of the vehicle body panels 3a and 3b so as to guide and align the rear portions of the vehicle body panels 3a and 3b in the weight direction of the vehicle body panels 3a and 3b.

Furthermore, in the exemplary embodiment of the present invention, when the vehicle body panels 3a and 3b are loaded in the weight direction of vehicle body panels 3a and 3b, the fourth roller attachments 431 of the fourth support unit 430 come into contact with the skin surface of the vehicle body panels 3a and 3b and rotate so as to stably support the skin surface.

Therefore, according to the loading jig apparatus 300 commonly used according to the exemplary embodiment of the present invention, the positions of the first, third, and fourth support units 320, 380 and 430 may be adjusted by the first moving units 310, the second moving units 360, and the third moving unit 410 so as to correspond to the sizes and shapes of the vehicle body panels 3a and 3b, which are different in accordance with the types of vehicles.

In addition, according to the loading jig apparatus 300 commonly used according to the exemplary embodiment of the present invention, the vehicle body panels 3a and 3b, which are assemblies of the trunk lid and the tail gate that are different in accordance with the types of vehicles, may be positioned and aligned at the home position in common by the first to fourth support units 320, 340, 380, and 430.

Accordingly, in the exemplary embodiment of the present invention, the vehicle body panels 3a and 3b, which are assemblies of the trunk lid and the tail gate that are different in accordance with the types of vehicles, may be positioned and aligned at the home position in common, thereby improving performance of flexible manufacturing for various types of vehicles.

In addition, in the exemplary embodiment of the present invention, the assemblies of the trunk lid and the tail gate, which have different shapes and sizes, respectively, in accordance with the types of vehicles, may be positioned and aligned at the home position in common, thereby reducing additional investment costs due to modifications or new manufacture of the jig apparatus when applying the jig apparatus to new types of vehicles.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A loading jig apparatus commonly used for a trunk lid and a tail gate, which serves to position and align vehicle body panels including inner parts, outer parts, and assemblies of the inner parts and the outer parts of the trunk lid and the tail gate at a home position in common, the loading jig apparatus comprising:
    a jig frame;
    a pair of first moving units which is installed on the jig frame so as to correspond to both left and right sides of a vehicle body panel, and moved in up and down directions, left and right directions, and front and rear directions by driving a drive motor;
    first support units which are installed at the first moving units, respectively, and support both sides of the vehicle body panel;
    a pair of second support units which is installed on the jig frame so as to correspond to a front side of the vehicle body panel, and supports the front side of the vehicle body panel;
    at least one second moving unit which is installed on the jig frame so as to correspond to a rear side of the vehicle body panel, and moved in the up and down directions and the front and rear directions by driving a drive motor; and
    a third support unit which is installed on the second moving unit, and supports the rear side of the vehicle body panel;
    wherein the second support units include first guide attachments which are mounted to the jig frame by first fixing brackets, respectively, fixedly installed to the first fixing brackets by second mounting brackets, and support the front side of the vehicle body panel.

2. The loading jig apparatus of claim 1, wherein the first support units include first guiders which are mounted to the first moving units by first mounting brackets, respectively, and align both side portions of the vehicle body panel.

3. The loading jig apparatus of claim 2, wherein the first support units include first roller attachments which are rotatably installed on the first mounting brackets, and support both side portions of the vehicle body panel.

4. The loading jig apparatus of claim 1, wherein the first guide attachment includes:
    a first guide surface, which aligns the front side of the vehicle body panel in a weight direction of the vehicle body panel, is formed to be inclined, and
    a second guide surface, which supports the front side of the vehicle body panel in a horizontal direction at a lower side of the first guide surface, is formed to be flat.

5. The loading jig apparatus of claim 4, wherein:
    the first guide surface is formed as a round-shaped spherical surface along an inclined direction, and
    the second guide surface is formed as a flat surface along the horizontal direction.

6. The loading jig apparatus of claim 1, wherein the second support units include:
    second guiders which are installed to the jig frame by first fixing brackets, respectively, mounted to the first fixing brackets by second mounting brackets, and align the front side of the vehicle body panel; and
    second roller attachments which are rotatably installed on the second mounting brackets, and support the front side of the vehicle body panel.

7. The loading jig apparatus of claim 1, wherein the third support unit includes:
    a second fixing bracket which is installed on the second moving unit in both side directions of the vehicle body panel; and
    swivel pads which are mounted on both sides of the second fixing bracket, and swivelably provided by ball joints so as to correspond to a rear side cross-sectional angle of the vehicle body panel.

8. The loading jig apparatus of claim 1, wherein the third support unit includes second guide attachments which are fixedly mounted on a pair of second moving units by third mounting brackets, respectively, and support the rear side of the vehicle body panel.

9. The loading jig apparatus of claim 8, wherein the second guide attachment includes:
    a third guide surface, which aligns the rear side of the vehicle body panel in a weight direction of the vehicle body panel, is formed to be inclined, and a fourth guide surface, which supports the rear side of the vehicle body panel in a horizontal direction at a lower side of the third guide surface, is formed to be flat.

10. The loading jig apparatus of claim 9, wherein:
the third guide surface is formed as a round-shaped spherical surface along an inclined direction, and
the fourth guide surface is formed as a flat surface along the horizontal direction.

11. The loading jig apparatus of claim 1, wherein the third support unit includes:
third guiders which are mounted to a pair of second moving units by third mounting brackets, respectively, and align the rear side of the vehicle body panel; and
third roller attachments which are rotatably installed on the third mounting brackets, and support the rear side of the vehicle body panel.

12. The loading jig apparatus of claim 1, further comprising:
at least one third moving unit which is installed on the jig frame so as to correspond to a central side of a skin surface of the vehicle body panel, and moved in the up and down directions and the front and rear directions by driving a drive motor; and
a fourth support unit which is installed on the third moving unit, and supports the skin surface of the vehicle body panel.

13. The loading jig apparatus of claim 12, wherein the fourth support unit includes:
a third fixing bracket which is installed on the third moving unit in both side directions of the vehicle body panel; and
fourth roller attachments which are rotatably installed on both sides of the third fixing bracket, respectively, and come into contact with the skin surface of the vehicle body panel.

14. A loading jig apparatus commonly used for a trunk lid and a tail gate, which serves to position and align vehicle body panels including inner parts of the trunk lid and the tail gate at a home position in common, the loading jig apparatus comprising:
a jig frame which includes a base frame, and a vertical frame installed at a rear side edge of the base frame in a vertical direction;
a pair of first moving units which is installed on the vertical frame so as to correspond to both left and right sides of a vehicle body panel, and moved in up and down directions, left and right directions, and front and rear directions by driving a drive motor;
first guiders which are mounted at the first moving units, respectively, and align both side portions of the vehicle body panel;
first roller attachments which are rotatably installed at the first moving units, respectively, and support both sides of the vehicle body panel;
a pair of first guide attachments which is mounted to the base frame so as to correspond to a front side of the vehicle body panel, and supports the front side of the vehicle body panel;
a second moving unit which is installed on the vertical frame so as to correspond to a rear side of the vehicle body panel, and moved in the up and down directions and the front and rear directions by driving a drive motor; and a pair of swivel pads which is mounted at the second moving unit, and swivelably provided by ball joints so as to correspond to a rear side cross-sectional angle of the vehicle body panel.

15. The loading jig apparatus of claim 14, wherein the first guide attachment includes:
a first guide surface, which aligns the front side of the vehicle body panel in a weight direction of the vehicle body panel, is formed to be inclined, and
a second guide surface, which supports the front side of the vehicle body panel in a horizontal direction at a lower side of the first guide surface, is formed to be flat.

16. The loading jig apparatus of claim 15, wherein:
the first guide surface is formed as a round-shaped spherical surface along an inclined direction, and
the second guide surface is formed as a flat surface along the horizontal direction.

17. A loading jig apparatus commonly used for a trunk lid and a tail gate, which serves to position and align vehicle body panels including outer parts of the trunk lid and the tail gate at a home position in common, the loading jig apparatus comprising:
a jig frame;
a pair of first moving units which is installed on the jig frame so as to correspond to both left and right sides of a vehicle body panel, and moved in up and down directions, left and right directions, and front and rear directions by driving a drive motor;
first guiders which are mounted at the first moving units, respectively, and align both side portions of the vehicle body panel;
first roller attachments which are rotatably installed at the first moving unit, respectively, and support both sides of the vehicle body panel;
a pair of first guide attachments which is mounted to the jig frame so as to correspond to a front side of the vehicle body panel, and supports the front side of the vehicle body panel;
a pair of second moving units which is installed on the jig frame so as to correspond to a rear side of the vehicle body panel, and moved in the up and down directions and the front and rear directions by driving a drive motor; and
second guide attachments which are installed at the second moving units, respectively, and support the rear side of the vehicle body panel.

18. The loading jig apparatus of claim 17, wherein the second guide attachment includes:
a third guide surface, which aligns the rear side of the vehicle body panel in a weight direction of the vehicle body panel, is formed to be inclined, and
a fourth guide surface, which supports the rear side of the vehicle body panel in a horizontal direction at a lower side of the third guide surface, is formed to be flat.

19. The loading jig apparatus of claim 18, wherein:
the third guide surface is formed as a round-shaped spherical surface along an inclined direction, and
the fourth guide surface is formed as a flat surface along the horizontal direction.

* * * * *